(12) United States Patent
Eckes et al.

(10) Patent No.: US 6,243,832 B1
(45) Date of Patent: Jun. 5, 2001

(54) NETWORK ACCESS SERVER TESTING SYSTEM AND METHODOLOGY

(75) Inventors: Van P. Eckes, Philadelphia, PA (US); Steven A. Geria, Cherry Hill, NJ (US); Alan P. Sheets, Feasterville, PA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/133,658

(22) Filed: Aug. 12, 1998

(51) Int. Cl.⁷ ...................................................... G06F 11/00
(52) U.S. Cl. ................................................ 714/33; 714/46
(58) Field of Search .................................. 379/1, 17, 219, 379/32, 220, 221, 275; 380/255; 714/33, 32, 43, 46; 370/904; 455/227, 181.1, 185.1, 186.1, 567

(56) References Cited

U.S. PATENT DOCUMENTS

| | | | |
|---|---|---|---|
| 3,922,499 | * 11/1975 | Athas et al. | 379/17 |
| 4,800,488 | * 1/1989 | Agrawal et al. | 364/200 |
| 4,945,554 | 7/1990 | Krause et al. . | |
| 5,278,823 | 1/1994 | Handel . | |
| 5,404,391 | * 4/1995 | Wavroch et al. | 379/59 |
| 5,416,825 | 5/1995 | Renger et al. . | |
| 5,452,339 | 9/1995 | Siu et al. . | |
| 5,471,521 | * 11/1995 | Minakami et al. | 379/88 |
| 5,488,648 | 1/1996 | Womble . | |
| 5,495,516 | 2/1996 | Lee et al. . | |
| 5,509,063 | * 4/1996 | Crabtree et al. | 379/221 |
| 5,528,661 | 6/1996 | Siu et al. . | |
| 5,539,659 | 7/1996 | McKee et al. . | |
| 5,539,883 | 7/1996 | Allon et al. . | |
| 5,553,058 | 9/1996 | Glitho . | |
| 5,555,377 | 9/1996 | Christensen et al. . | |
| 5,557,748 | 9/1996 | Norris . | |
| 5,633,909 | * 5/1997 | Fitch | 379/15 |
| 5,854,889 | * 12/1998 | Liese et al. | 714/43 |

OTHER PUBLICATIONS

Newman, David et al., "Close–Up on Remote Access Servers", Data Communications, October 1996, pp. 77–79, 81–85.

"Avalanche/RA: The ultimate remote performance test tool", http:www.midnight.com, printout date Sep. 2, 1997, publication date unknown.

\* cited by examiner

Primary Examiner—James P. Trammell
Assistant Examiner—Pierre E. Elisca
(74) Attorney, Agent, or Firm—McDermott, Will & Emery (57) ABSTRACT

A network access test system includes a test computer system having a modem bank coupled to a network access server via a telephone switch. The network access server is coupled to one or more host computer systems, preferably over a local area network. The test computer system is configured to simulate a large number of test users concurrently accessing the host computer systems via the network access server and performing typical data transfers. Preferably, each simulated test user employs unique network addresses assigned for the test computer system and the host computer system, respectively.

37 Claims, 4 Drawing Sheets

NETWORK ACCESS SERVER TESTING SYSTEM AND METHODOLOGY

TECHNICAL FIELD

The present invention relates to computer networking and, more particularly, to a system and methodology for testing network access servers.

BACKGROUND ART

The Internet is a rapidly growing, world-wide network of computer systems. One reason for the current popularity of the Internet is electronic mail (email). Users can send and receive email messages to friends, family members, and business contacts around the nation and indeed the world within minutes. Furthermore, the World-Wide Web is another popular aspect of the Internet. The World-Wide Web features information stored in "home pages" or "web pages" in the form of text, graphics, audio, and even video files at various sites in the Internet. Web pages include links to other web pages, so that a user "surfing" the World-Wide Web with a "browser" application can easily visit related sites with a click of a button. Consequently, Internet service providers (ISPs) are deploying host computer systems sited on the Internet. These host computer systems coordinate the flow of email, provide storage for web pages, and enable users at a personal computer to connect with the Internet.

Figure 4:
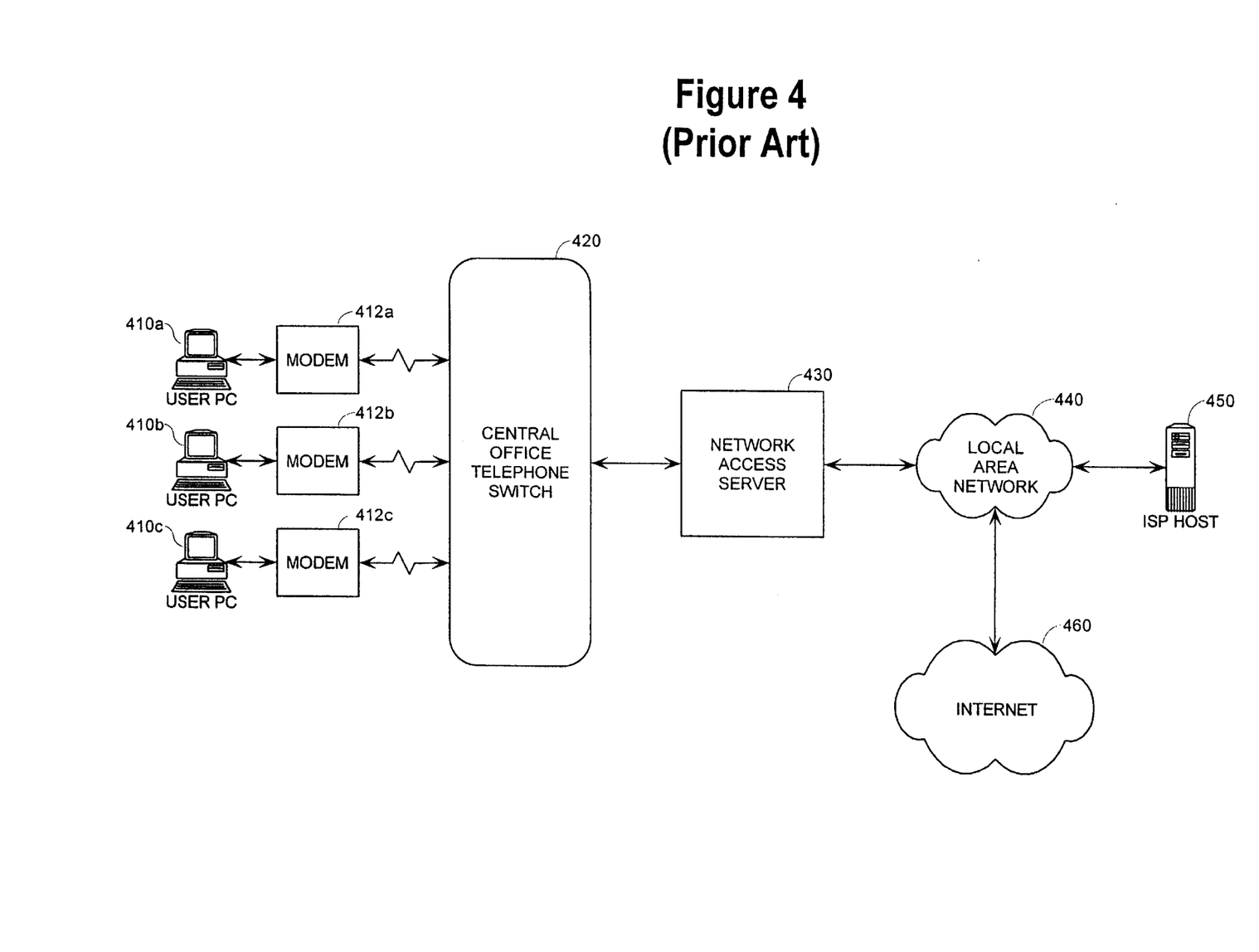
FIG. 4 is a prior art diagram of an exemplary network that furnishes a user with access to the Internet.

A lot has to happen, however, before a user can connect to the Internet. FIG. 4 depicts a typical Internet access network used by an Internet service provider to enable one of its customers to use the Internet. A user at a personal computer (PC), for example user PC 410a, executes locally resident network software to initiate a connection with an Internet service provider. When executed, the network software causes modem 412a to dial a predefined telephone number for the Internet service provider over a telephone line. The telephone call is routed by a central office telephone switch 420 to a network access server 430 belonging to the Internet service provider. The link between the central office telephone switch 420 can be a multiplexed line, such as a T1 line or a Primary Rate Interface (PRI) type ISDN link.

The network access server 430, also known as a "remote access server" (RAS), is a combination of a modem bank and a high-end router. The incoming telephone call is automatically directed to one of the modems (not separately shown) belonging to the network access server 430, typically assigned in a round-robin fashion. For example, the dial up number can be a lead number in a multi-line hunt group, so that a second, concurrent incoming telephone would be automatically "rolled over" to the next modem. In this manner the network access server 430 allows a plurality of users, for example at user PCs 410a, 410b, and 410c to access the Internet via modems 412a, 412b, and 412c, respectively.

Accordingly, one of the modems on the network access server 430 answers the telephone call and undergoes a modem handshaking procedure with the source modem 412a. When the modem handshaking is complete, the network access server 430 provides access to a host computer system 450 of the Internet service provider via a local area network 440 such as an Ethernet network. The host computer system 450, also referred to as "ISP host 450," is typically a mini-computer or high end PC running a multi-process operating system, such as the Unix™ operating system or the Windows NT™ operating system.

Many ISP hosts 450 are configured to use the "point-to-point protocol" (PPP) for communication with one of the user PCs 410. For PPP, each user PC is assigned an IP (Internet protocol) address for Internet communications. An IP address has four octets, each octet specifying a number from 0–255. When written in a human-readable format, the octets of an IP address are often separated by periods, for example, "10.1.1.1". As well known in the art, ISP hosts 450 can be configured to use other communications protocols such as SLIP (single-line Internet protocol).

Since the ISP host computer system 450 also has an IP address, the user PC 410a and the ISP host 450 can communicate with each other using standard Internet protocols specifying their IP addresses. For example, a user can download files from ISP host 450, e.g. text and graphics, or upload files to ISP host 450. These files can include computer programs, graphics, and documents. ISP host 450 has access to an Internet connection 460.

Some common Internet activities for users involve downloading a large number of files. For example, a user may wish to read news articles from news groups or bulletin board postings on Usenet. In this case, a user executes a "news reader" application, which coordinates the transfer of unread or otherwise desired articles from ISP host 450 or from a news server on Internet 460.

As another example, the user may wish to access home pages on the World Wide Web. In this case, the user executes a "browser," e.g. Navigator™ available from Netscape Communications Corp. or the Internet Explorer™ available from Microsoft Corp. The browser application coordinates the downloading of related files from ISP host 450 or other sites on the Internet 460. These files comprise text files, i.e. home pages coded in the HyperText Markup Language HTML, graphics files, commonly encoded in such formats as GIF or JPEG, audio files, and other kinds of files.

As the user base for the Internet increases, Internet service providers have to support a growing number of customers. Consequently, the performance and reliability of their network access servers 430 under peak demand times become crucial.

For example, some unreliable network access servers undergo a loss of throughput for a high number of calls. Other network access servers may lose throughput if one of the connected users is downloading a very large binary file (e.g. a 2 megabyte graphics file). Some can only support a limited number of concurrent dial ups, even though the total number of modems is greater. Other network access servers run fine for a week, only to spontaneously reboot, disconnecting all the users.

To ensure reliability of network access servers before the Internet service providers go on-line with real customers, the vendors of network access servers need some system and methodology to effectively test the access network components. Systems already exist for some low level aspects of the network, for example, electrical functions. Some manufacturers have load tested their own network elements by manually initiating calls and data communications from a plurality of PCs.

Such testing, however, is not scalable nor standardized, and it is difficult to test high stress conditions. For example, a vendor of a network access server capable of supporting twenty-four concurrent connections may only use twelve PCs with modems for testing, due to the limited number of testers and financial resources in the quality assurance department. Thus, the network access server can be tested for up to half the total theoretical number of concurrent dial ups, twenty-four. However, during actual operation, it is not uncommon for twenty-four customers to dial in at the same time.

For example, if the network access server reboots and disconnects connected users, those users typically attempt to reestablish their connections all at the same time. Therefore, conventional methods are unable to test likely usage patterns of network access servers.

DISCLOSURE OF THE INVENTION

There is a need for a system and methodology to test network access servers under high stress conditions and with likely usage patterns. A need also exists for an automatic network access server testing method and system.

These and other needs are met by the present invention, in which a test computer system with a bank of communications interfaces is coupled to a network access server via a telephone switch and is configured to simulate multiple, concurrent users using the network access server.

Accordingly, one aspect of the invention is a network for testing a network access server. The network includes a test computer system. The test computer system has more than one communications interfaces, such as modem or ISDN cards, each of which is coupled to a telephone switch. The network access server is coupled to the telephone switch and to a host computer system. The test computer system is configured to simulate a programmed number of concurrent users. For each simulated user, the test computer system initiates a connection with the host computer system via the network access server and transfer data, e.g. textual data, compressed data, and graphical data, between the test computer system and host computer system through the network access server.

Concurrent usage of the network access server by multiple, simulated users from the test computer system enables a large number of the modems on the network access server to be automatically and substantially simultaneously exercised. Thus, a network access server can be stress-tested at a usage level that is likely to occur in a deployed environment.

Another aspect of the invention is a method and computer readable medium bearing instructions for testing a network access server. A table is accessed containing a plurality of entries indicative of respective simulated users. For at least some of the entries, a connection is initiated between a test computer system and a host computer system through the network access server and data is transferred therebetween, preferably using source and destination IP (Internet protocol) addresses that are unique for each simulated user. Use of unique source IP addresses and unique destination IP addresses for each simulated user facilitates the diagnosis of faults discovered during the course of the test and ensures that each modem in the network access server is fully exercised.

Additional objects, advantages, and novel features of the invention will be set forth in part in the description which follows, and in part will become apparent upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

BEST MODE FOR CARRYING OUT THE INVENTION

A method and system for testing network access servers are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In accordance with one embodiment of the present invention, a network access server is tested within a network by automated procedures executed by a test computer system. The test computer system is capable of simulating a plurality of concurrent users, accessing a host computer system via the network access server. It may be helpful to discuss first how the test computer system and the host computer system can be implemented.

Hardware Overview

Figure 1:
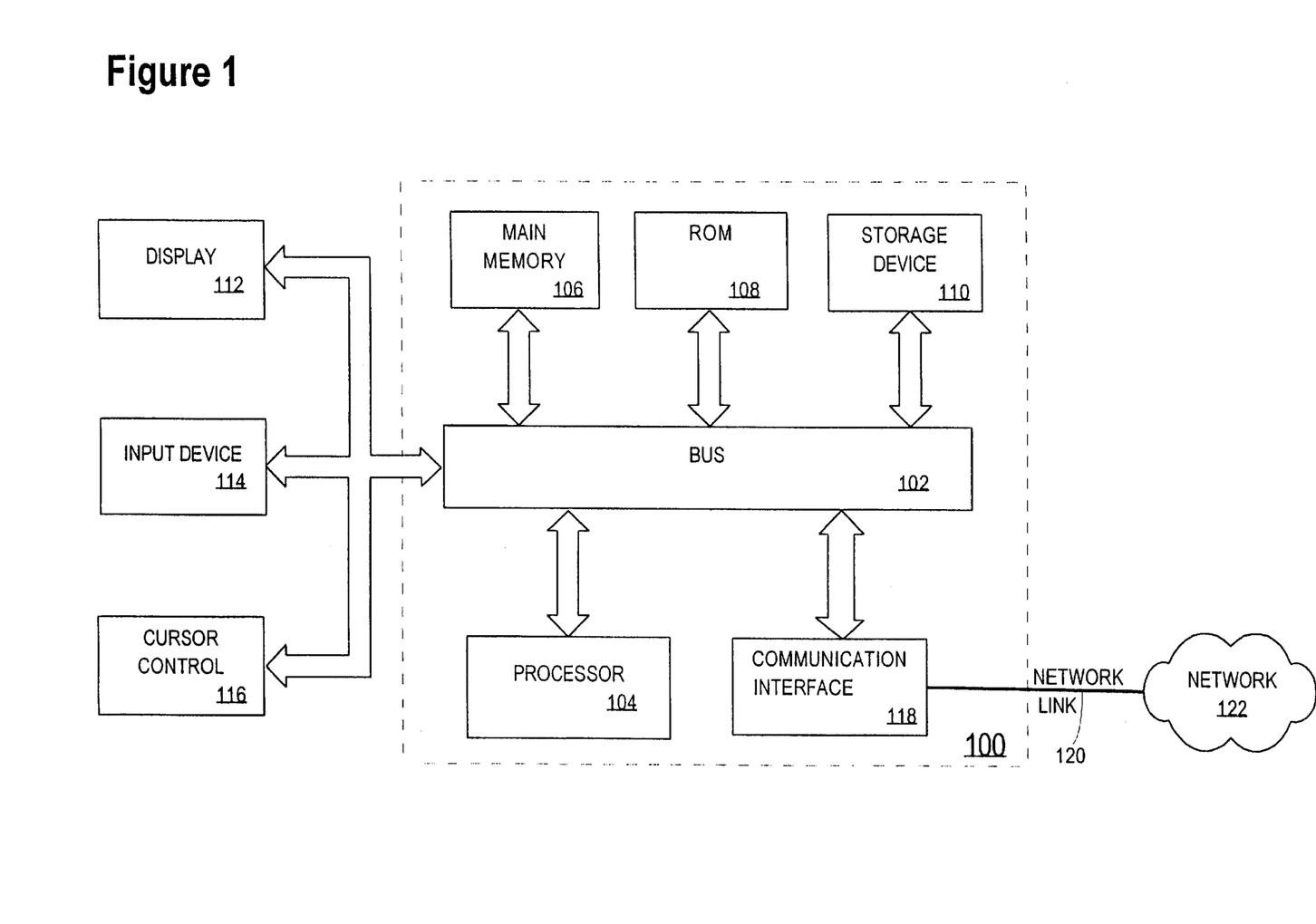
FIG. 1 is a block diagram of a computer system upon which the present invention can be implemented.

FIG. 1 is a block diagram which illustrates a computer system 100 upon which components of an embodiment of the invention may be implemented. The computer system 100 may server as a test computer system or a host computer system, as discussed in detail later.

Computer system 100 includes a bus 102 or other communication mechanism for communicating information, and a processor 104 coupled with bus 102 for processing information. Although only a single processor 104 is depicted in FIG. 1, it is to be understood, as well-known in the art, that computer system 100 can include one or more processors 104 executing in parallel.

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of computer system 100 to test network access servers. According to one embodiment of the invention, testing network access servers is provided by computer system 100 in response to one or more processors 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read. Execution of the sequences of instructions contained in main memory 106 causes processor 104 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to bus 102. Communication interface 108 provides a two-way data communication coupling to a network link 120 that is connected to a network 122. For example, communication interface 118 may be an integrated services digital network (ISDN) card or a modem to provide a data communication connection to a corresponding type of telephone line. In fact, some implementations of computer system 100, for example a test computer system, include a plurality of communication interfaces 118 situated in a modem bank or a bank of ISDN cards.

As another example, for computer systems 100 such as a host computer system connected to the Internet, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks 122 to other data devices. For example, such as in the case of a host computer system, network 122 can be a local area network. Alternatively, for computer system such as user's PC, network 122 can be the "Internet," wherein the network link 120 directly accesses a host computer or data equipment operated by an Internet Service Provider (ISP) Network 122 uses electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through network 122, network link 120 and communication interface 118. In the Internet example, a server might transmit a requested code for an application program through the network 122, such as the Internet, a connection with an ISP, or local network, and communication interface 118. In accordance with the invention, one such downloaded application provides for testing network access servers as described herein.

The received code may be executed by processor 104 as it is received, and/or stored in storage device 110, or other non-volatile storage for later execution. In this manner, computer system 100 may obtain application code in the form of a carrier wave.

Test Network Architecture

Figure 2:
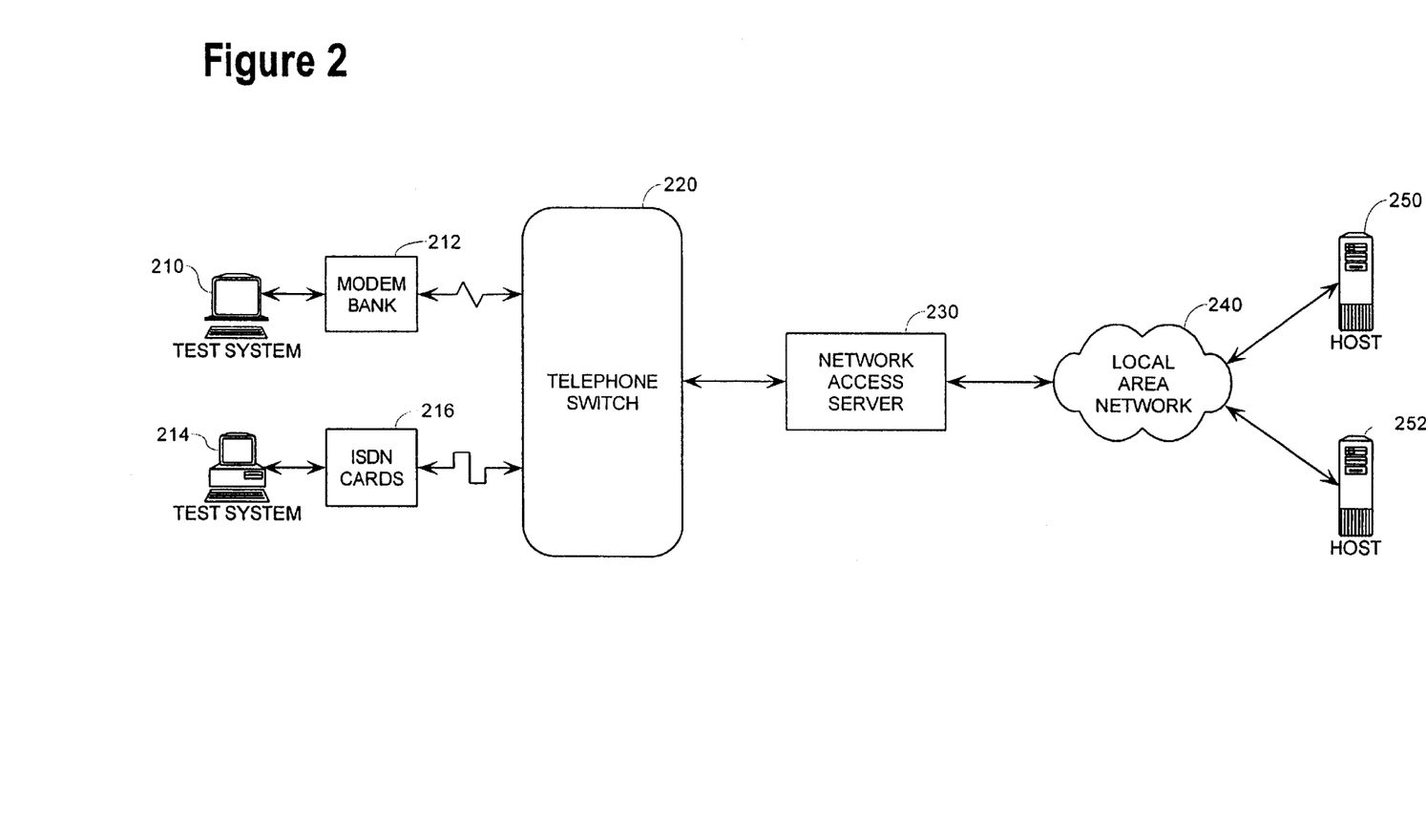
FIG. 2 is a diagram of a network access server testing network according to an embodiment of the present invention.

FIG. 2 depicts a network architecture for testing a network access server 230, i.e. the "system under test," according to an embodiment of the present invention. The test network comprises at least two computer systems, test computer system 210 and host computer system 250, which can be implemented as described hereinabove with reference to computer system 100. Test computer system 210 includes at least one modem bank 212 installed thereon. The modem bank 212 includes a plurality of modems, at least twenty-four but preferably at least forty-eight, for communication between test system 210 and network access server 230.

Each modem is coupled to a telephone switch 220 and thence the network access server 230. The telephone switch 220, which may be a central office switch or a testing switch, is configured to route telephone calls for a prescribed telephone number to the network access server 230. To reduce cabling, the connection to the telephone switch 220 may be over a multiplexed line such as a T1 line or the like.

Modems provide an analog connection between the test system 210 and the network access server 230. If the network access server 230 supports digital connections, then it is desirable to use a plurality of ISDN cards for testing digital communications. According to one embodiment of the invention depicted in FIG. 2, both analog and digital communications can be tested with the addition of a second test system 214 with a plurality of ISDN cards 216, for accessing the network access server 230 via telephone switch 220. Alternatively, a test system can have installed thereon both modems and ISDN cards as the communication interfaces.

The network access server 230 is coupled to one or more host computer systems 250 and 252 via a local area network 240. When a modem call is initiated through one of the modems in the modem bank 212 of the test system 210, a communications channel between the test system 210 and the host system 250 is established via telephone switch 220, the network access server 230, and local area network 240. Consequently, the disclosed configuration allows data to be transferred between the test system 210 and the host system 250 through the network access server 230.

In order to subject the network access server 230 to a high amount of stress testing, it is desirable to over-engineer the testing network. In other words, each of the components other than the network access server 230 has a higher expected performance capability than what is judged to be typical in an installed environment. In this manner, as the communications load increases, it is preferable for the network access server 230 to be the first component to fail.

For example, the test system 210 can be a high-end PC or, more preferably, a workstation, e.g. one available from Sun Microsystems. The modems in the modem bank 212 can be very high-speed modems. The telephone switch 220 can be a specialized testing switch, such as a Telios class 5 switch, rather than a normal central office switch. The connection to the local area network can be a 100BaseT Ethernet connection. In addition, a plurality of host systems, e.g. hosts 250 and 252, may be employed to achieve load balancing of the requests.

In accordance with subjecting the network access server under test to a high amount of stress, it has been found that using a low overhead protocol, e.g. FTP (File Transfer Protocol) or "rcp" (remote copy), in retrieving files from the host computer system 250, is preferable to using a higher overhead protocol, e.g. HTTP (HyperText Transfer Protocol). Although HTTP is indeed a commonly used protocol, especially by World Wide Web servers and browsers, the protocol requires the execution of several processes on the host computer system 250 to fetch the various files that may be requested. Consequently, the host computer system 250 may get bogged down under the load. Since it is desirable to load test the network access server 230, but not the host computer system 250, it is preferable to use a lower overhead protocol such as FTP or "rcp" to transfer data between the host computer system 250 and the test computer system 210.

Alternatively, it is also desirable to perform the testing procedures in a network configuration that is typical of the actual deployment environment for the network access server 230. For example, the telephone switch 220 can be an actual central office telephone switch. As another example, lower speed modems in the modem bank 212 may be employed. In yet another example, common, but high overhead, protocols such as HTTP may be used to transfer data between the host computer system 250 and the test computer system 210.

This alternative approach may uncover failures in the network access server 230 due to poorly functioning equipment elsewhere in the network. These approaches are complementary, and it is contemplated that a thorough test of a network access server 230 would involve testing the device under both configurations.

Simulating Multiple, Concurrent Users

One aspect of the invention relates to the use of a test system 210 to simulate a plurality of users concurrently establishing connections and transferring data with the host system 250 (and/or host system 252) via the network access server 230. Accordingly, the test system 210 is preferably a computer system running a multi-processing or multi-tasking operating system, in which the usage patterns of each user is simulated in a separate, concurrently executing process.

For ease of configuration, a table or flat file is stored at the test system 210 having an entry for each test user in the simulation. Each entry includes such information as an identifier for the user, a telephone number to dial, and a "command set" of tests to be run by the user. It is evident that the entry may be augmented to include other test user-specific information as needed, for example the name of the host computer system 250 or 252.

The network access server test is commenced by executing a computer program on test computer system 210. This test program is responsible for spawning a plurality of background processes, each process for the purpose of simulating a user according to a respective entry in the test user table.

Figure 3:
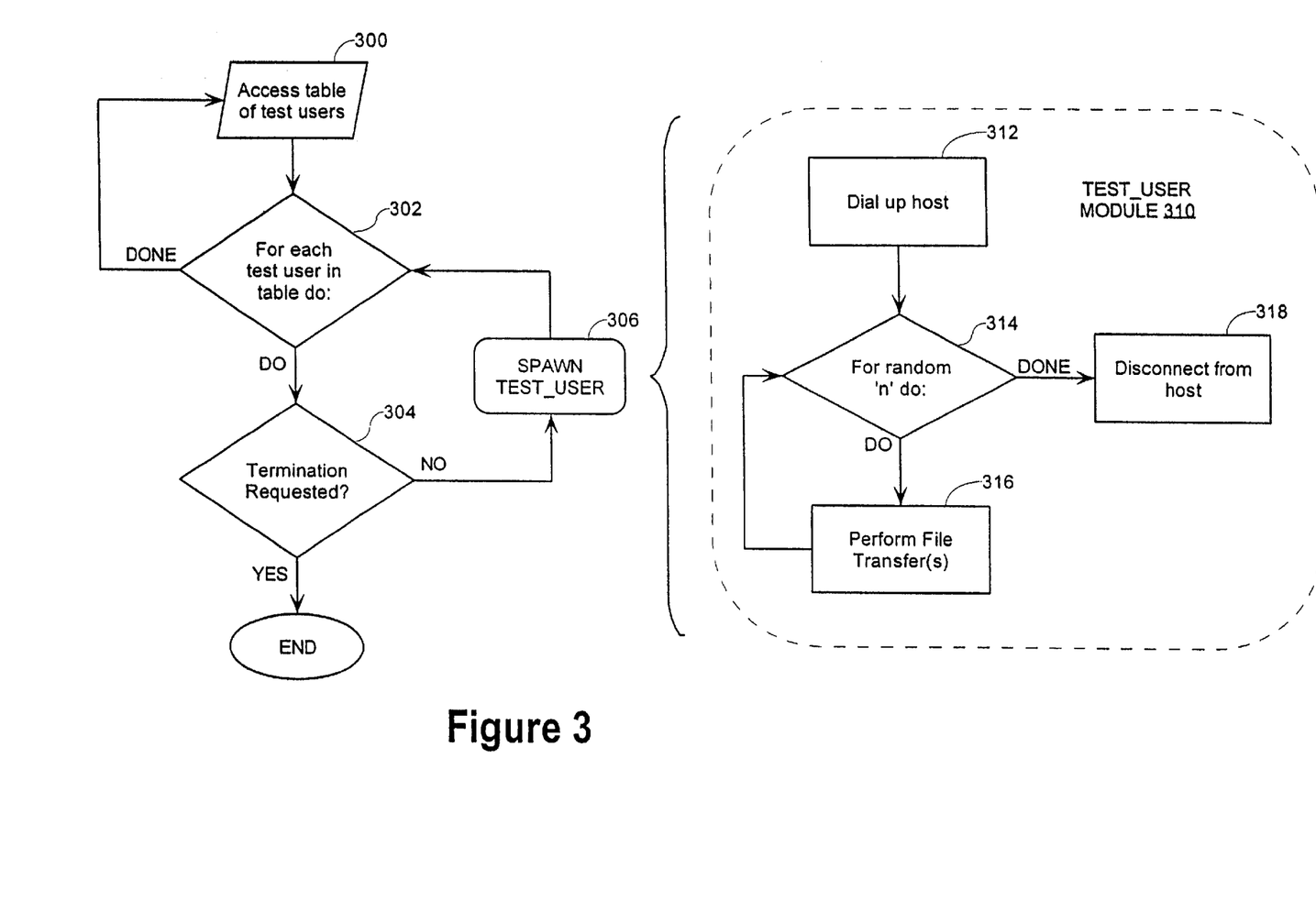
FIG. 3 is a flowchart illustrating the operation of simulating user traffic according to an embodiment of the present invention.

Referring to FIG. 3, when the test program is executed, the table of test users is accessed, starting at the beginning of the table (step 300). In a loop controlled by step 302, the table is sequentially scanned, collecting parameters from each entry for spawning a background process to simulate an individual test user.

According to one implementation of the present invention, the test program can be controlled even while running via a "control file." This control file can be merely a text file stored at a predefined location in the file system of test computer system 210. To control the execution of the testing program, the operator writes a desired command in the control file, for example with a text editor or by a common shell statement such as "echo stop>test_control" where "test_control" is the name of the control file.

In step 304, instructions in the test program read the control file at the predefined file system location. If, for example, the control file contains the word "stop," then the test program terminates execution. It is evident that other control commands such as "pause" can be implemented through this mechanism.

If execution of the test program is not terminated or paused via a command in the command file, execution proceeds to step 306, where a background process is spawned for simulating a user based on parameters read from the test user table. According to one embodiment of the present invention, the test program executes a parameterized "test_user" module 310 in the background. The test_user module 310 encapsulates the steps 312–318 in a computer-readable medium, e.g. in the form of an executable binary file containing machine language instructions or a shell script (e.g. Korn shell, Bourne shell, C shell, etc.) containing interpreted instructions. Parameters may be passed from the test program to the test_user module 310 as command line parameters, environment variables, data in a file, or through other techniques known in the art including a combination of the above mentioned techniques.

Spawning a process into the background allows for a plurality of processes to be concurrently executed, for example, by time sharing. More specifically, the test program, the "parent process," interacts with the multi-process operating system to create another process or "child process." Once created, the child process is effectively independent of the parent process and is executed concurrently by the operating system. In particular, the test program arranges for the child process to execute the instructions in the test_user module 310.

As well-known in the art, background processes can be spawned in various ways depending on the operating environment and implementation of the test program. If the test program is implemented as a shell script, e.g. a Korn shell script running under the Unix™ operating system or the Microsoft Windows NT™ operating system, then the test_user module 310 may be spawned by appending an ampersand ("&") after the command line invoking the module. As another example, if the test program is written in a compiled systems programming language such as C, then the test_user module 310 may be spawned under the Unix™ operating system by executing a "fork" operating system command to create a child process, followed by an "exec" command in the child process with the file name of the test_user module 310.

Concurrent execution of the test program and an instance of the test_user module 310 may be simultaneous if the test computer system 100 includes a plurality of processors, or substantially simultaneous on a single processor by alternatively dedicating small slices of time to the two processes. A parent process can spawn a plurality of child processes, each of which are executing concurrently and independently of each other.

As described in more detail hereinafter with reference to steps 312–318, the spawned test_user module 310 simulates a test user in the background. After spawning the test_user module 310, execution begins in the test_user module 310 and concurrently continues in the test program, looping back to step 302. According to one implementation of the present invention, execution of the test program immediately loops back to step 302 so that communication interfaces for a plurality, for example a dozen, of simulated users would initiate a connection with the network access server 230 at substantially the same time. To randomize the behavior of the network access server test according to another implementation of the present invention, the test program is programmed to wait (or "sleep") a random number of seconds (e.g. two to four seconds) before looping back to step 302.

When execution in the test program loops back to step 302, which occurs concurrently with a spawned instance of the test_user module 310, a subsequent entry in the test user table is processed. Steps 304 and 306 are consequently performed, resulting in the spawning of another process of the test_user module 310. This other test_user process executes independently of and concurrently with previously spawned test_user processes.

After all the entries in the test user table have been processed in step 302, the test program optionally waits a random amount of time (e.g. two to four seconds) and returns to step 300 to reiterate through the test user table again. In this manner a test of a network access server 230 can continue indefinitely, perhaps for weeks, until problems with the network access server 230 become evident or the test program is terminated, for example, through the control file inspected in step 304. In addition, the test user table can be changed by person while the simulation is running to dynamically modify the behavior of the network access server test.

Simulating a Test User

As previously explained, a parameterized test_user module 310 is spawned in the background at step 306 for simulating a test user. The test_module 310 is configured to receive a plurality of parameters that direct how a particular test user is to be simulated. In a specific example, the parameters include a unique user identifier of the simulated test user, a telephone number for one of the modems in the modem bank 212 to dial to reach the network access server 230 under test, and a "command set" of tests to be run by the user. Generally, these parameters are derived from a respective entry in the test user table fetched during the execution of step 302.

In order to facilitate the simulation of a test user, each simulated test user is preferably assigned the unique user identifier, which includes an encoding of a unique serial number. For example, a user identifier can be of the form "A0100S1", where the "A" portion of the user identifier indicates that analog modems in the modem bank 212 are used. If, on the other hand, ISDN cards 216 are used, then the user identifier would commence with a "D" to indicate a digital connection. The "01" in the user identifier "A0100S1" indicates which one of a plurality of test computer systems is being employed. In this case, the "01" indicates the first test computer system 210.

The "00" of the exemplary user identifier "A0100S1" is a serial number of the simulated user, which, in this format, are decimal digits indicating one of a hundred users. It is evident, of course, that support for more users can be extended by adding another digit or expressing the serial number in hexadecimal. The "S1" portion of the exemplary user identifier indicates the desired system under test, since it is possible to test a plurality of network access servers 230 in this configuration. Generally, the value of the final digit after the "S" is correlated with the telephone for dialing the desired network access server 230. For example, "S1" may correspond to a telephone number of 555-1212 to access a first network access server, and "S2" may correspond to 555-1313 to access a second network access server. This unique user identifier need not actually be recorded in the test user table, only derivable from information available in the test user table. Thus, the information in the test user table can be entered in a more "user-friendly" format, e.g. specifying the user as "user000".

In step 312, the process executing the test_user module 310 initiates a connection with the host computer system 250 (or host computer system 252 as the case may be) via the network access server 230 under test. This connection is initiated by causing a modem of the modem bank 212 to dial the desired telephone number. There are various approaches in determining which modem of the modem bank 212 is to be used for a particular simulated test user, but the present invention is not limited to any particular approach. For example, the modem can be assigned on a round-robin basis by treating the modem bank 212 as a modem pool. As another example, a modem can be dedicated to a specific simulated test user, correlated via the serial number of the user encoded in the user identifier.

When the modem of modem bank 212 is directed to dial out the appropriate number for the network access server 230, the telephone call is routed by telephone switch 220 to that network access server 230. When the network access server 230 receives that telephone call, the call is answered by one of the modems belonging to the network access server 230. Generally, the test computer system 210 is not able to control which modem on the network access server 230 will respond to a particular telephone call. Most commercial network access servers 230 under test, however, are configured to record logging information such as user identifiers or IP addresses for each modem on the network access server 230. Thus, it is possible to determine from the logging information which modems on the network access server 230 correspond to which simulated test users have failed.

When the call is answered by one of the modems of the network access server 230, the sending and receiving modems undergo a standard handshaking procedure. Modem handshaking involves such activities as determining the baud rate or transmission speed of signal between the two modem, and other low-level communications items. When the handshaking has successfully completed, the network access server 230 establishes a link via local area network 240 to the host computer system 250 to negotiate a PPP connection. Under normal operating conditions, negotiating a PPP connection involves authentication and the assignment of an IP address within a block of IP addresses to the test computer system 210.

Authentication involves checking the user identifier and optionally a password against a list of authorized users to determine whether the user is authorized to make the connection. After a successful authentication, an IP address is assigned to the user's computer system. This assignment is usually made on a dynamic basis, depending on which IP addresses in the block of IP addresses are already in use. According to a preferred embodiment of the invention, however, a unique IP address is assigned during the PPP negotiation based on the user identifier.

There are various approaches to assigning an IP address based on the user identifier. One such approach is to assign an IP address from the explicitly reserved block of class A addresses with an octet including the serial number encoded within the user identifier. For example, for user identifier "A0100S1", the corresponding IP address assigned may be "10.1.0.101" where the third octet "0" includes the serial number. In this IP address, the first octet "10" indicates the reserved block of class A addresses; the second octet "1" indicates the first test computer system 210; the third octet "0" includes the user serial number; and the fourth octet "101" is not used. It is evident that the present invention is not limited to this particular addressing scheme. In fact, the information in the second and third octets can be placed in the fourth octets in other embodiments. Not using the fourth octet information allows the IP address to be truncated in a log file without losing meaningful information.

One of the benefits of putting the serial number of the user in the IP address is that the particular simulated test user can be identified easily from examination of the IP address used by the test user. For example, a straightforward inspection of an IP address such as "10.1.0.101" readily yields the test computer system and the simulated test user, in this example, the first test computer system 210 and simulated test user 00.

Another benefit relates to how IP packets are conventionally routed between networked computer systems. Typically, networked computer systems employ dynamic routing techniques in which an IP packet is not sent directly to the destination computer system but forwarded to a related computer system. This conventional approach is intended to simplify the routing procedures.

For example, a test computer system 210 may connect to the host system 250 via the network access server 230, having assigned thereto IP addresses of "10.1.0.101" and "10.1.1.101", for two simulated test users respectively. Under dynamic routing techniques, a host computer system 250 may send all packets back to test computer system 210, through the same connection established between the two computer systems, because the IP addresses are of the same form "10.1.*.*" where "*" indicates any octet value. In this example, data destined for the IP address "10.1.1.101", corresponding to the second simulated test user, is sent over the connection for the first test user and hence over the same modem in the network access server 230. Consequently, only one modem, under conventional dynamic routing techniques, of the plurality of modems in the network access server 230 is being exercised during the test.

Accordingly, the test network is configured to use static routing when transferring data between the test computer system 210 and the host computer system 250. Static routing prohibits the forwarding of IP packets to another computer system by specifying the direct path the data transferred in IP packets are sent. Thus, each modem in the network access server 230, through which a connected is made by a simulated test user, can be fully exercised during the test. Both the host computer system 250 and the test computer system 210 are configured to build the static routing table. These static routes can be built at boot-time, especially for host computer system 250, or immediately after establishing a connection through network access server 230, especially for test computer system 210.

In order to expedite the static routing, the host computer system 250 is configured to respond to a plurality of destination IP addresses, such that each simulated test user employs a unique IP address on the test computer system 210 side and on the host computer system 250 side. Unique destination IP addresses are preferably assigned by including the serial number for the user in one of the octets of the destination IP address. For example, a first simulated test user may use "10.1.0.101" as the source IP address for the test computer system 210 and "172.22.0.206" as the destination IP address for the host computer system 250. Accordingly, a second simulated test user may use "10.1.1.101" as the source IP address for the test computer system 210 and "172.22.1.206" as the destination IP address for the host computer system 250. In both these examples, the third octet includes the serial number of the simulated test user.

After establishing the connection in step 312, execution proceeds to step 314, which controls a loop for performing the various tests involving data transfers a random number of times, e.g. four to nine times. Randomizing the number times a test is optional but preferable, in order to subject the network access server 230 to a greater variety of different combinations of data transfers.

In step 316, test data is transferred by executing a standard Internet utility between test computer system 210 and host computer system 250 via a modem on modem bank 212, telephone switch 220, network access server 230, and local area network 240. The IP addresses used for these standard Internet utilities are the unique IP addresses assigned for each simulated test user.

The FTP (file-transfer protocol) utility has been found to be especially beneficial due to the relatively low overhead imposed on the host computer system 250. The FTP utility is configured to accept a file containing a list of commands for transferring a file between the test computer system 210 and the host computer system 250. The name of command file can be passed into the test_user module 310 as the "command set" parameter.

An exemplary FTP command is "get /tmp/filename" where "/tmp/filename" is a predetermined name of a file resident on the file system of the host computer system 250. This command directs the host computer system 250 to fetch the file called "/tmp/filename" in its file system for downloading to the test computer system 250 using the TCP/IP protocol (Transmission Control Protocol/Internet Protocol). Since many files are downloaded during the test, the downloaded file is preferably immediately deleted or downloaded directly to a zero-byte storage null device, such as "/dev/null" on the Unix™ operating system or "nul:" on operating systems available from Microsoft Corp.

The downloaded files can be a mix of text files, containing textual data in the form of printable ASCII characters, compressed text files, graphics files, executable files, etc. These files can also be of various sizes. Since many network access servers 230 include modems that can automatically compress textual data, it is desirable to include uncompressed text files among the files to be downloaded. Sending binary information in the form of compressed files, graphics files, or executable files is also desirable because they load the modems in a different manner.

It is contemplated that implementations of the present invention may use other utilities for transferring data between test computer system 210 and host computer system 250. For example, data can be transferred with the UDP/IP protocol using the TFTP utility (Trivial File Transfer Program). As another example, news articles, generally containing textual data, can be downloaded with the NNTP utility. Moreover, data can be uploaded through the FTP utility or through an "rcp" (remote copy) utility. In fact, data can also be transferred according to HTTP (HyperText Transfer Protocol), but this may yield an unacceptable amount of loading the host computer system 250. Each of these utilities can be programmed to perform specified operations, e.g. by parameter or by file redirection, which can be specified by the "command set" parameter.

Therefore, via the "command set" parameter, different simulated test users can perform different mixes of data transfers to simulate the different kinds and lengths of files that are typical in a deployed, live installation of a network access server 230.

After the various data transfers have been performed in step 316 and after the loop controlled by step 314 terminates, the connection between the test computer system 210 and the host computer system 250 for the test user being simulated by the test_user module 310 is disconnected. Thus, the various aspects of a user's session with a host computer system 250 belonging to an Internet service provider is effectively simulated.

Generally, the simulation on test computer system 210, including additional test computer systems, e.g. test computer system 214, is run until a problem, fault, error, or mistake is noticed for. the network access server 230. At this point, the simulation is stopped or paused by means of the aforementioned control file. It is contemplated that the test program and the test-user module 310 keep very detailed logs of the activity performed during the test so that specific problems can be easily diagnosed.

By spawning a plurality of background processes invoking the test_user module 310 for a respective test user at a test computer system 210, multiple numbers of test users can be simulated. Accordingly, a testing network and methodology is provided for stress-testing a network access server 230. Consequently, a more thorough testing of network access servers may be attained than in conventional techniques prior to deployment by an Internet service provider.

In the foregoing specification, the invention has been described with reference to specific embodiments thereof. It will be apparent, however, that various modifications and changes may be made thereto without departing from the broader spirit and scope of the invention. The specification and drawings are, accordingly, to be regarded in an illustrative rather than a restrictive sense.

What is claimed is:

1. A network for testing an network access server, comprising:
   a test computer system having installed thereon a plurality of communication interfaces;
   a telephone switch coupled to the communication interfaces of said test computer system and to said network access server;
   a host computer system coupled to said network access server;
   wherein said test computer system is configured to simulate a plurality of concurrent users, for each said simulating user said test computer system performing the steps of:
   (a) initiating a connection from said test computer system to said host computer system via said telephone switch and said network access server; and
   (b) transferring data between said test computer system and said host computer system via said telephone switch and said network access server.

2. The network of claim 1, wherein said plurality of communication interfaces includes a plurality of modems.

3. The network of claim 1, wherein said plurality of communication interfaces includes a plurality of ISDN cards.

4. The network of claim 1, wherein said telephone switch is a central office switch.

5. The network of claim 1, wherein said telephone switch is a testing switch.

6. The network of claim 1, wherein said host computer system is coupled to said network access server via a local area network.

7. The network of claim 1, wherein the step of transferring data between said test computer system and said host computer system via said telephone switch and said network access server includes the step of downloading textual data from said host computer system via said telephone switch and said network access server.

8. The network of claim 7, wherein the step of downloading textual data from said host computer system via said telephone switch and said network access server includes the step of downloading a text file at a predetermined location in a file system of said host computer system via an FTP (file-transfer protocol) utility.

9. The network of claim 7, wherein the step of downloading textual data from said host computer system via said telephone switch and said network access server includes the step of downloading a news article from said host computer system.

10. The network of claim 1, wherein the step of transferring data between said test computer system and said host computer system via said telephone switch and said network access server includes the step of downloading a compressed text file from said host computer system via said telephone switch and said network access server.

11. The network of claim 1, wherein the step of transferring data between said test computer system and said host computer system via said telephone switch and said network access server includes the step of downloading a graphics file from said host computer system via said telephone switch and said network access server.

12. The network of claim 1, wherein said host computer system is configured to respond to a plurality of IP (Internet protocol) addresses.

13. A network for testing a network access server, comprising:
   a test computer system having installed thereon a plurality of communication interfaces;
   a telephone switch coupled to the communication interfaces of said test computer system and to said network access server;
   a host computer system coupled to said network access server and configured to respond to a plurality of IP (Internet protocol) addresses;
   wherein said test computer system is configured to simulate a plurality of concurrent users, for each said simulating user said test computer system performing the steps of:
   (a) initiating a connection from said test computer system to said host computer system via said telephone switch and said network access server; and
   (b) transferring data between said test computer system and said host computer system via said telephone switch and said network access server;
   wherein the step of initiating a connection from said test computer system to said host computer system via said telephone switch and said network access server includes the step of assigning a first unique IP address for each simulated concurrent user.

14. The network of claim 13, wherein the step of transferring data between said test computer system and said host computer via said telephone switch and said internet access server includes the steps of:

determining a second unique IP address from among said plurality of IP addresses; and transferring said data using the first unique IP address to indicate the test computer system and the second unique IP address for the host computer system.

15. The network of claim 1, wherein the test computer system is configured to perform step (b) a random number of times for each concurrent user.

16. The network of claim 1, wherein the test computer system is configured to perform step (b) for at least two of said concurrent users at substantially the same time.

17. A method of testing a network access server in a network including a test computer system having installed thereon a plurality of communication interfaces, a telephone switch coupled to said communication interfaces and to said network access server, and a host computer system coupled to said network access server, said method comprising the steps of:

accessing a table containing a plurality of entries indicative of respective simulated users;

performing the following steps substantially concurrently for at least some of the entries in the table:
(1) initiating a connection from said test computer system to said host computer system via a respective one of said communications interfaces through said telephone switch and said network access server; and
(2) transferring data between said test computer system and said host system through said telephone switch and said network access server.

18. The method of claim 17, wherein step (1) includes the step of initiating the connection from said test computer system to said host computer system via a modem.

19. The method of claim 17, wherein step (1) includes the step of initiating the connection from said test computer system to said host computer system via an ISDN card.

20. The method of claim 17, wherein step (1) includes the step of initiating the connection from said test computer system to said host computer through a central office switch simulator.

21. The method of claim 17, wherein the step of transferring data between said test computer system and said host computer system via said telephone switch and said network access server includes the step of downloading textual data from said host computer system via said telephone switch and said network access server.

22. The method of claim 21, wherein the step of downloading textual data from said host computer system via said telephone switch and said network access server includes the step of downloading a text file at a predetermined location in a file system of said host computer system via an FTP (file-transfer protocol) utility.

23. The method of claim 21, wherein the step of downloading textual data from said host computer system via said telephone switch and said network access server includes the step of downloading a news article from said host computer system.

24. The method of claim 17, wherein the step of transferring data between said test computer system and said host computer system via said telephone switch and said network access server includes the step of downloading a compress text file from said host computer system via said telephone switch and said network access server.

25. The method of claim 17, wherein the step of transferring data between said test computer system and said host computer system via said telephone switch and said network access server includes the step of downloading a graphics file from said host computer system via said telephone switch and said network access server.

26. A method of testing a network access server in a network including a test computer system having installed thereon a plurality of communication interfaces, a telephone switch coupled to said communication interfaces and to said network access server, and a host computer system coupled to said network access server, said method comprising the steps of:

accessing a table containing a plurality of entries indicative of respective simulated users;

performing the following steps substantially concurrently for at least some of the entries in the table:
(1) initiating a connection from said test computer system to said host computer system via a respective one of said communications interfaces through said telephone switch and said network access server; and
(2) transferring data between said test computer system and said host system through said telephone switch and said network access server, the step of transferring data comprising downloading a graphics file from said host computer system via said telephone switch and said network access server;

and further comprising the steps of:
assigning a first IP address indicative of the test computer system and a second IP address indicative of the host computer system, wherein said first IP address and said second IP address are unique for each simulated user;
establishing statically a route between said first IP address and said second IP address; and
wherein the step of transferring data between said test computer system and said host computer system via said telephone switch and said network access server includes the step of transferring said data using said first IP address to indicate the test computer system and said second IP address to indicate the host computer system.

27. The method of claim 26, wherein the step of assigning a first IP address indicative of the test computer system and a second IP address indicative of the host computer system includes the steps of:

assigning the first IP address with an octet thereof containing a serial number of one of the simulated users; and assigning the second IP address with an octet thereof containing the serial of said one of the simulated users.

28. The method of claim 17, further comprising the step of performing step (2) a random number of times for each of the at least some of the entries in the table.

29. The method of claim 17, further comprising the step of performing step (2) at substantially the same time for at least two of the entries in the table.

30. The method of claim 17, said sequences of instructions further comprise sequences of instructions for performing the step of performing step (2) at substantially the same time for at least two of the entries in the table.

31. A computer readable medium bearing sequences of instructions for testing a network access server in a network including a test computer system having installed thereon a plurality of communication interfaces, a telephone switch coupled to said communication interfaces and to said network access server, and a host computer system coupled to said network access server, said sequences of instructions comprising sequences of instructions for performing the steps of:

accessing a table containing a plurality of entries each indicative of a distinctive simulated user;

performing the following steps substantially concurrently for a plurality of the entries in the table:
(1) initiating a connection from said test computer system to said host computer system via a respective one of said communication interfaces through said telephone switch and said network access server; and
(2) transferring data between said test computer system and said host system through said telephone switch and said network access server.

32. The computer readable medium of claim 31, wherein step (1) includes the step of causing a modem to initiating the connection from said test computer system to said host computer system.

33. The computer readable medium of claim 31, wherein step (1) includes the step of causing an ISDN card to initiate the connection from said test computer system to said host computer system.

34. The computer readable medium of claim 31, wherein step (2) includes the step of downloading a text file at a predetermined location in a file system of said host computer system via an FTP (file-transfer protocol) utility.

35. The computer readable medium of claim 31, wherein step (2) includes the step of downloading a news article from said host computer system.

36. A computer readable medium bearing sequences of instructions for testing a network access server in a network including a test computer system having installed thereon a plurality of communication interfaces, a telephone switch coupled to said communication interfaces and to said network access server, and a host computer system coupled to said network access server, said sequences of instructions comprising sequences of instructions for performing the steps of:

accessing a table containing a plurality of entries each indicative of a distinctive simulated user;

performing the following steps substantially concurrently for a plurality of the entries in the table:
(1) initiating a connection from said test computer system to said host computer system via a respective one of said communication interfaces through said telephone switch and said network access server; and
(2) transferring data between said test computer system and said host system through said telephone switch and said network access server wherein step (2) includes the step of transferring said data using a first IP address to indicate the test computer system and a second IP address to indicate the host computer system, wherein said first IP address and said second IP address are unique for each other.

37. The computer readable medium of claim 31, wherein said sequences of instructions further comprise sequences of instructions for performing step (2) a random number of times for each of the at least some of the entries in the table.

* * * * *